United States Patent
Brunner et al.

(10) Patent No.: US 8,228,339 B2
(45) Date of Patent: Jul. 24, 2012

(54) FRAMEWORK FOR GRAPHICS ANIMATION AND COMPOSITING OPERATIONS

(75) Inventors: Ralph Brunner, Cupertino, CA (US); John Harper, San Francisco, CA (US); Peter N. Graffagnino, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/367,717

(22) Filed: Feb. 7, 2012

(65) Prior Publication Data

US 2012/0154415 A1    Jun. 21, 2012

Related U.S. Application Data

(63) Continuation of application No. 11/500,154, filed on Aug. 4, 2006.

(51) Int. Cl.
*G09G 5/36* (2006.01)
*G06F 13/00* (2006.01)
*G06F 3/00* (2006.01)

(52) U.S. Cl. .................. 345/545; 345/537; 715/700
(58) Field of Classification Search .................. None
See application file for complete search history.

*Primary Examiner* — Joni Hsu
*Assistant Examiner* — David H Chu
(74) *Attorney, Agent, or Firm* — Wong, Cabello, Lutsch, Rutherford & Brucculeri LLP

(57) ABSTRACT

A graphics animation and compositing operations framework has a layer tree for interfacing with the application and a render tree for interfacing with a render engine. Layers in the layer tree can be content, windows, views, video, images, text, media, or other types of objects for an application's user interface. The application commits state changes to the layers of the layer tree. The application does not need to include explicit code for animating the changes to the layers. Instead, an animation is determined for animating the change in state by the framework which can define a set of predetermined animations based on motion, visibility, and transition. The determined animation is explicitly applied to the affected layers in the render tree. A render engine renders from the render tree into a frame buffer. Portions of the render tree changing relative to prior versions can be tracked to improve resource management.

21 Claims, 7 Drawing Sheets

FRAMEWORK FOR GRAPHICS ANIMATION AND COMPOSITING OPERATIONS

CROSS REFERENCE TO RELATED APPLICATIONS

This is a continuation application of currently pending U.S. application Ser. No. 11/500,154, by Ralph Brunner et al., filed 4 Aug. 2006 to which priority is claimed and which is incorporated by reference herein in its entirety. This application is also related to U.S. Application Ser. No. 13/186,026 filed 19 Jul. 2011, now U.S. Pat. No. 8,130,231, and U.S. application Ser. No. 11/756,311 filed 31 May 2007, now U.S. Pat. No. 7,945,608.

COMPUTER PROGRAM LISTING

The following table shows 14 source code files of an application programming interface that are provided as computer program listing text files uploaded via EFS-WEB in compliance with M.P.E.P §502.05 and are hereby incorporated by reference.

TABLE 1

Computer Program Listing Appendix

| # | File | Size | Type | Last Modified |
|---|---|---|---|---|
| 1 | LayerKit | 1 KB (683 bytes) | Header File | May 22, 2006 7:17 PM |
| 2 | LKAnimation | 8 KB (7,211 bytes) | Header File | May 22, 2006 7:15 PM |
| 3 | LKBase | 3 KB (2,475 bytes) | Header File | May 22, 2006 7:15 PM |
| 4 | LKConstraintLayoutManager | 3 KB (2,836 bytes) | Header File | May 22, 2006 7:15 PM |
| 5 | LKFilterinfo | 1 KB (939 bytes) | Header File | May 22, 2006 7:15 PM |
| 6 | LKLayer | 16 KB (16,307 bytes) | Header File | May 22, 2006 7:15 PM |
| 7 | LKObject | 3 KB (2,420 bytes) | Header File | May 22, 2006 7:15 PM |
| 8 | LKOpenGLLayer | 3 KB (2,582 bytes) | Header File | May 22, 2006 7:15 PM |
| 9 | LKScrollLayer | 2 KB (1,360 bytes) | Header File | May 22, 2006 7:15 PM |
| 10 | LKTextLayer | 3 KB (2,093 bytes) | Header File | May 22, 2006 7:15 PM |
| 11 | LKTiming | 3 KB (2,447 bytes) | Header File | May 22, 2006 7:15 PM |
| 12 | LKTimingFunction | 2 KB (1,622 bytes) | Header File | May 22, 2006 7:15 PM |
| 13 | LKTransaction | 3 KB (2,168 bytes) | Header File | May 22, 2006 7:15 PM |
| 14 | LKTransform | 4 KB (3,223 bytes) | Header File | May 22, 2006 7:15 PM |

FIELD OF THE DISCLOSURE

The subject matter of the present disclosure relates to a framework for handling graphics animation and compositing operations for a graphical user interface of a computer system application.

BACKGROUND OF THE DISCLOSURE

Mac OS X provides prior art graphics and imaging frameworks for developers to create "views" for graphical user interfaces (GUIs) of a computer application. (MAC OS is a registered trademark of Apple Computer Inc. of Cupertino, Calif.) For example, Cocoa is an object-oriented application environment that developers can use to develop Mac OS X native applications. Apple's Cocoa Application Framework (also referred to as Application Kit or AppKit) is one of the core Cocoa frameworks. Application Kit provides functionality and associated Application Programming Interfaces (APIs) for applications, including objects for graphical user interfaces, event-handling mechanisms, application services, and drawing and image composition facilities.

NSView is part of Cocoa's Objective-C API and is an abstract class that defines basic drawing, event-handling, and printing architecture of applications. With NSView, each "view" of an application's GUI is dealt with using local coordinates, and each view is positioned relative to its parent view in a hierarchical fashion. Using a view hierarchy is useful for building complex user interfaces out of modular parts. The Application Kit framework is used to develop NSView-based applications. This framework contains objects needed to implement a graphical, event-driven user interface that includes windows, dialogs, buttons, menus, scrollers, text fields, etc. Application Kit framework handles the drawing of objects, communicates with hardware devices and screen buffers, clears areas of the screen before drawing, and clips views.

GUIs for computer applications have increased in complexity and are usually designed to handle views, animations, videos, windows, frames, events, etc. Even with the increased complexity, the goal of developers is to make the GUIs more tactile and natural in appearance. Accordingly, developers must consider how to create and manage the GUIs for computer applications with this goal in mind.

Referring to FIG. 1A, a rendering process 100 according to the prior art is schematically illustrated. In the rendering process 100, an application 110, which can be based on NSView as discussed above, inputs GUI information into a backing store 120 and issues rendering commands to the render engine 130. The render engine 130 renders the GUI information from the backing store 120 into a frame buffer 140. The render engine 130 can use Apple's Core Image and Core Video. Core Image is an image processing framework, and Core Video is an video processing framework. Scan-out hardware 150 then outputs the rendered information in the frame buffer 140 to a display 160 using a frame rate 180 of the display 160.

This prior art rendering process 100 has no built-in framework for animating objects or views. Instead, the NSView-based application 110 handles animation explicitly by moving views around, resizing views, etc. To provide animation, most NSView-based applications 110 developed in the art resort to using "snapshots" of the views and compositing the snapshots using other facilities. In FIG. 1A, the application 110 is show having a pseudo-code loop 112 for animating movement of an object or view for the application's GUI. In this simplified example, the object or view is being moved from a start point A to an end point B (e.g., the application 110 may receive user input moving a view from a starting position on the display to an ending position). The typical developer of the application 110 does not want the object to disappear from point A on the display 160 and suddenly appear at point B on the display 160 because users prefer a more gradual or "natural" movement.

To make the movement more gradual or "natural," the developer of the application 110 typically animates the movement of the object from start point A to end point B using explicit code such as code segment or loop 112. In this simplified code, the loop 112 is used to animate the object by incrementally moving the object some distance X for each iteration of the loop 112. FIG. 1B shows some resulting positions of an object or view 164 as it would appear incrementally on displayed results 162 as the application 110 of FIG. 1A performs the animation of the object 164 with the iterative loop 112 of FIG. 1A. The number of steps or "snapshots" used to animate the movement of the object 164 is decided by the developer. In addition to such an iterative loop 112 for moving objects, the developer must include explicit code in the application 110 to implement any form of animation (e.g., fade-in, fade-out, resize, etc.) for an object.

In addition to requiring explicit animation in the application 110, the data structures and painting model for NSView present problems when the application 110 has dynamic content. For example, NSView makes no particular distinction between changes in content and layout and is not well tuned for continuous re-layout. As a NSView object is moved, for example, it creates "damage" to content in its wake that requires other views to be redrawn. Redrawing a view typically invokes the model-to-view mapping code of NSView-based application 110 and requires expensive computations to be performed (particularly if the model data needs to be retrieved over a network).

The timing of services for this form of application 110 offers some additional difficulties for developers. Most animations are done using one or more timers (e.g., the embedded loops or iterative steps 112) in the main event loop of the application 110. Therefore, the duty cycle of the timer for the animation is completely dependent on how fast the application 110 services its main event loop. Although some events can be handled quickly, other events may take much longer and may actually be subject to I/O delays.

In addition, the frame buffer 140 and scan-out hardware 150 operate under a frame rate 180 to output information to the display 160. The frame rate 180 is typically about 60-Hz. To improve the handling of events, developers attempt to operate the application 110 in synchronization with the frame rate 180 of the hardware. In this way, the majority of events of the application 110 can be timely handled within the main loop of the application 110 and rendered to the display 160 at the frame rate 180. However, maintaining such a consistent frame rate of 60-Hz. in the main loop of the application 110 can be difficult. Furthermore, determining what actual frame rate to use and determining when to initiate the timer to keep it in sync with video blanking of the scan-out hardware 150 is not readily apparent in a given context because the application 110 is not given intimate knowledge of the video display 160 and its associated hardware 150.

In addition to presenting problems for developers with respect to animation and event handling, the NSView-based application 110 may have problems related to layout of the GUI for the application 110. For example, a number of constraints must typically be applied to views when they are resized for display. One of the views may have a fixed absolute size, while other views may be designed to change size with the composition. Additionally, many views (e.g., text or web views) must explicitly change how they are represented as a function of the actual size at which they are to be displayed. Consequently, the text or web view may need to invoke its own layout techniques when it is resized. Developers of the NSView-based application 110 must explicitly handle these types of complex issues.

The subject matter of the present disclosure is directed to overcoming, or at least reducing the effects of, one or more of the problems set forth above.

SUMMARY OF THE DISCLOSURE

A framework for performing graphics animation and compositing operations is disclosed. The framework is used as part of rendering process to render a user interface of an application for display on a computer system. The framework is divided into two processes. A layer tree process interfaces with the application, and a render tree process interfaces with a render engine. The layer tree process has a first data structure or layer tree that contains object or layers associated with the user interface of the application. The layers can be content, windows, views, video, images, text, media, or any other type of object for a user interface of an application. The render tree process is separate from the layer tree process and does not interface with the application. The render tree process has a second data structure or render tree that contains object or layers associated with the layer tree. The render engine renders from the render tree.

When the application changes or is manipulated to change a layer of the user interface (e.g., a user moves a layer from a first position to a second position in a window of the user interface), the layer tree process receives the changes from the application and implements the changes directly to the layer tree. The changes from the application change the state of one or more layers in the layer tree. For example, if a layer has been moved in the application, then attributes describing the position of the affected layer in the layer tree will change. From the change in state of the affected layer in the layer tree, an animation and compositing process independent from the application determines what animation to use to animate the change of the affected layer. The animation and compositing process then implements the determined animation on the affected layer of the render tree. Then, the render engine renders the layers in the render tree into a frame buffer of the computer system.

In one technique to improve resource usage, the framework can focus on dirty regions of the render tree when rendering. A "dirty region" is one or more layers or objects of the render tree that have changed relative to their immediate prior versions. For example, the dirty regions can be indicated by change objects added to the associated layers of the render tree that have been changed relative to their immediately prior version. The change objects are updated at each transaction of rendering the render tree. During rendering, the render engine renders only those layers that have changed relative to their immediately prior version.

In another technique to improve resource usage, user interface information from an application is stored to a first buffer. A buffer handler receives a first update region of the user interface information from the application. In response, the buffer handler stores the user interface information from the first buffer into a second buffer except for the first update region. The render engine renders from the second buffer for display on the computer system, and the buffer handler marks the first buffer as purgeable. During subsequent processing, the buffer handler determines whether the first buffer has been reclaimed in response to receiving a second update region from the application. If the first buffer has not been reclaimed, buffer handler can use the first buffer again.

The foregoing summary is not intended to summarize each potential embodiment or every aspect of the present disclosure.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Figure 1A:
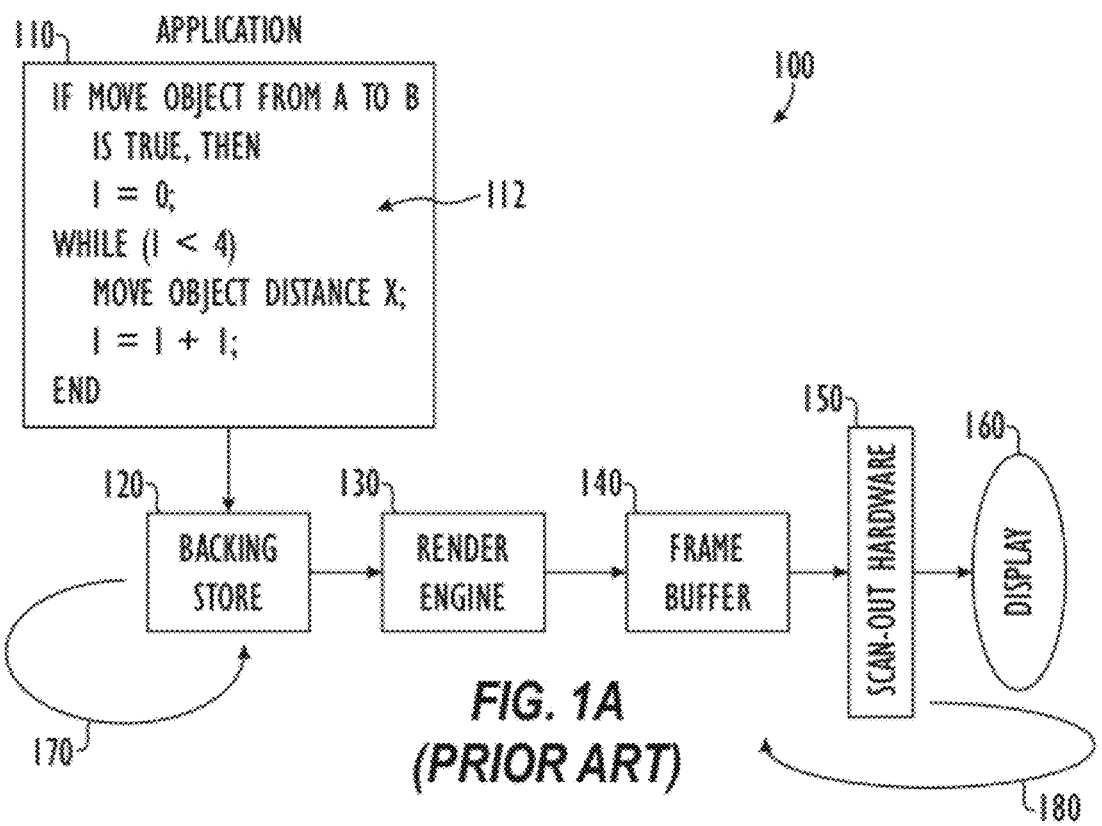
FIG. 1A illustrates a rendering process according to the prior art.
Figure 1B:
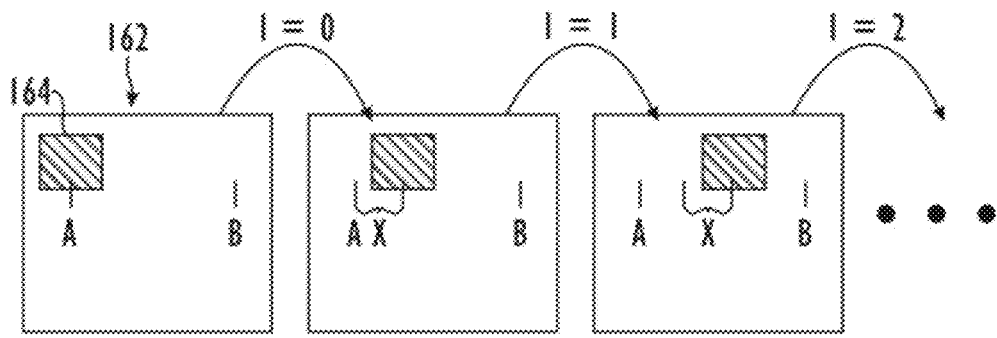
FIG. 1B illustrates example results of the prior art rendering process of FIG. 1A.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

I. Overview of Layer Kit Framework

Figure 2A:
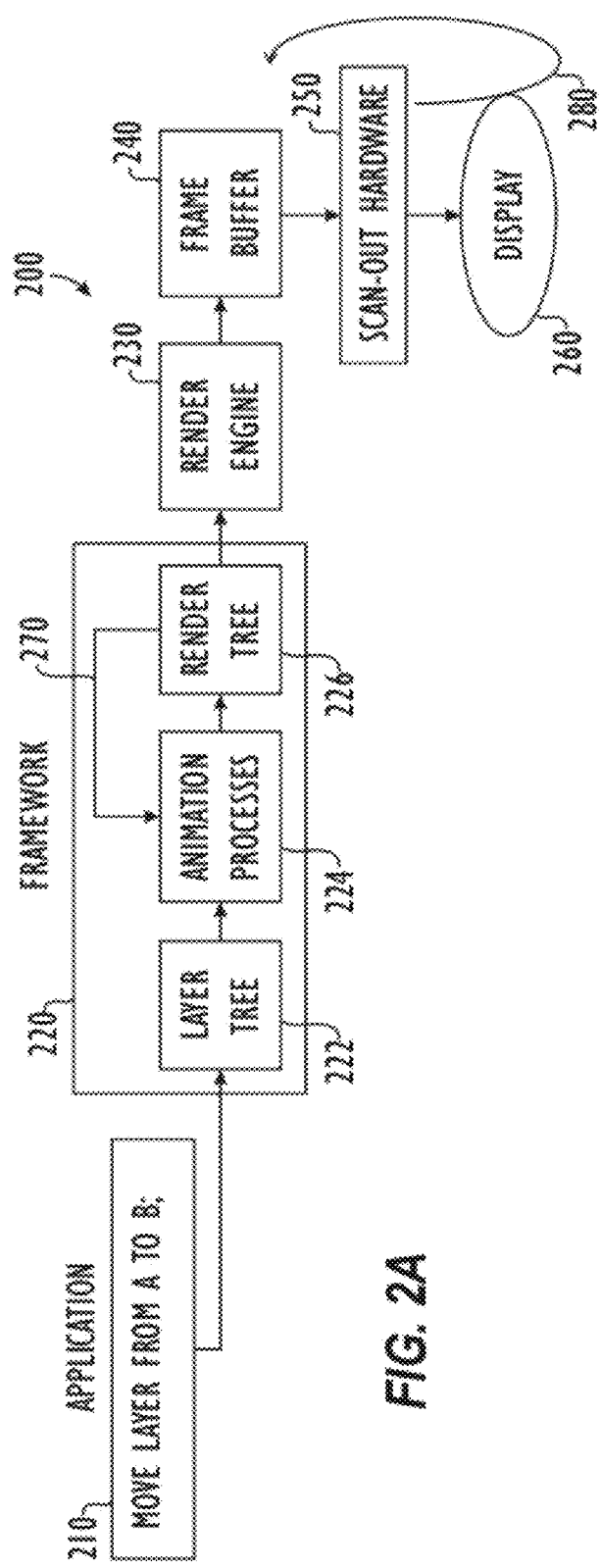
FIG. 2A illustrates an embodiment of a rendering process according to certain teachings of the present disclosure.

Referring to FIG. 2A, one embodiment of a rendering process 200 according to certain teachings of the present disclosure is schematically illustrated. In the rendering process 200, an application 210 inputs graphical user interface (GUI) information into a backing store (not shown), and a layer kit framework 220 is used to process the GUI information in the backing store. Once the framework 220 has processed the GUI information, a render engine 230 renders the processed information into a frame buffer 240. Although not shown in FIG. 2A, the render engine 230 typically renders processed information into an assembly buffer that is then composited into the appropriate location of the frame buffer 240. When compositing is completed, scan-out hardware 250 outputs the rendered information in the frame buffer 240 to a display 260 using a frame rate 280 of the display 260.

The processing performed by the layer kit framework 220 includes graphics animation and compositing operations for the application 210. To perform the operations, the layer kit framework 220 divides the processing into a layer tree 222 and a render tree 226. In this two-tree approach, the layer tree 222 is exposed to the application 210 and is used for implicit animation and implicit layout of graphics objects (also referred to herein as layers). On the other hand, the render tree 226 is manipulated and is traversed by the render engine 230.

As will be discussed in more detail later, the layer tree 222 includes a data structure that interfaces with the application 210. The data structure of the layer tree 222 is configured to hold a hierarchy of layers. The layers are objects having various properties and attributes and are used to build the GUI of the application 210. (The terms "property" and "attribute" may be used interchangeably in the present disclosure). In general, for example, the layers can include content, windows, views, video, images, text, media, etc. The data structure of the layer tree 222 is preferably as small and compact as possible. Therefore, many of the attributes of the layers preferably have default values kept in an extended property dictionary, such as NSDictionary of Apple's Cocoa application environment.

During operation, the application 210 interacts with the layer tree 222 of the framework 220 to manipulate the hierarchy of layers in the layer tree 222. The application 210 can be any computer application or client process that manipulates or changes the layers being displayed. When the application 210 commits an event or change to the layer tree 222, the framework 220 determines what events or changes are made at each layer by the application 110. These events or changes in the layer tree 222 are then committed to an animation and compositing process 224 of the framework 220. This process 224 determines one or more implicit animation functions of the framework 220 to use on the layer tree 222 based on the committed events or changes for each layer of the layer tree 222.

The animation and compositing process 224 then performs explicit animation of the events or changes and configures the layout of the layers in the render tree 226. The animation and layout of the render tree 226 are then rendered by the render engine 230 and output to the frame buffer 240. Any manipulations of layers made by the application 210 to the layer tree are not evaluated at the frame rate 280 of the display 260. Instead, changes in the render tree 224 are traversed and updated at the frame rate 280.

As alluded to above, the framework 220 separates the animation and compositing of layers from the application 210. For example, when the application 210 makes changes, the affected layers in the layer tree 222 are instantly changed from one state to another. State changes reflected in the layers of the layer tree 222 are then "percolated" to the physical display 260 by animating the changes and compositing the layers of the render tree 226 from the initial state of the layers to their final or end-state. This form of animation and composition is referred to herein as "implicit animation" and is part of the animation and compositing process 224 of FIG. 2A.

By using implicit animation in the framework 220, the application 210 does not have to include code for animating changes (e.g., movement, resizing, etc.) of layers to be displayed. Accordingly, any code required for animating layers can be minimized in the application 210. As shown in simplified form in FIG. 2A, for example, the application 210 may not require an embedded loop for animating changes to the layers. Instead, the application 210 includes code that indicates a change in the state of a layer (e.g., indicates a change in position of a layer). The framework 220 determines from the changes made to the layers in the layer tree 222 what implicit animation to perform on the layers, and then the framework 220 explicitly performs that animation on the layers using the render tree 226. Accordingly, animations can be abstracted in such a way that the code of the application 210 does not need to run at the frame rate 280. This allows the animation for objects/layers to be decoupled from the logic of the application 210 and allows the application 210 and the animations to run on separate threads in the rendering process 200.

The animation and compositing process 224 can perform a number of different types of animation on layers or objects. For example, if the application 210 operates on the layer tree 222 to change a layer from start point A to end point B in the GUI for the application 210, the animation and compositing process 224 automatically manipulates (i.e., without application 210 input) the representation of that layer in the render tree 226 to animate its movement from point A to point B on the display 260. In another, example, if the application 210 operates on the layer tree 222 to add a new layer to the layer tree 222, the animation and compositing process 224 may automatically manipulate the render tree 226 to fade in the new layer. In yet another example, if the application 210 operates on the layer tree 226 to replace an existing layer with a new layer, the animation and compositing process 224 automatically manipulates the render tree 226 to animate a transition from the existing layer to the new layer.

Figure 2B:
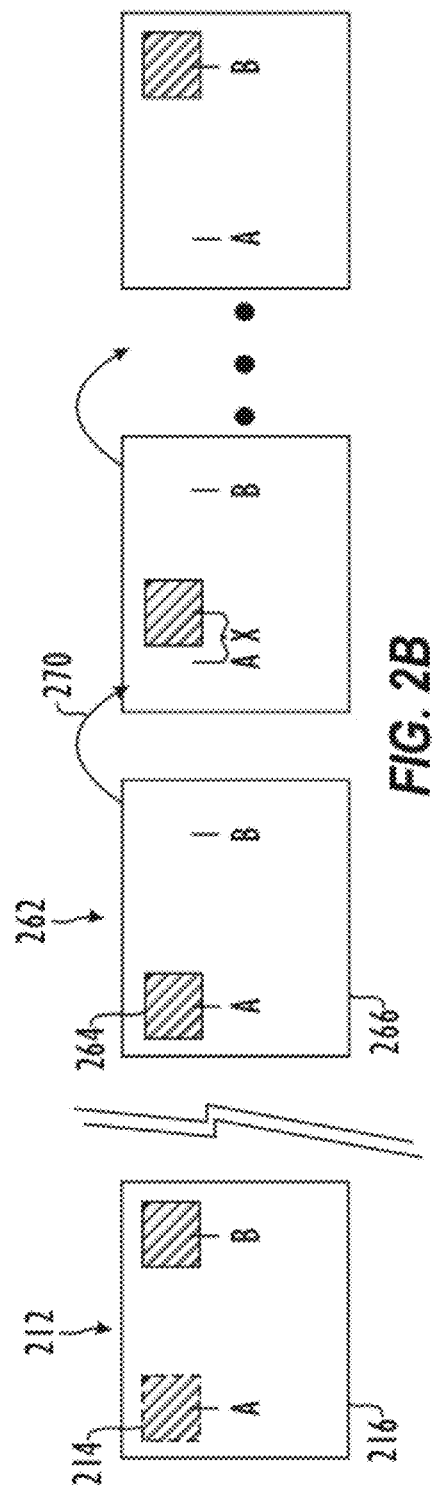
FIG. 2B illustrates example results of the rendering process of FIG. 2A.

To help illustrate the how the application 210 changes the state of layers in the layer tree 222, FIG. 2B shows an example result 212 of a layer 214 of the layer tree 222 of FIG. 2A being changed from a start state to an end state by the application 210 of FIG. 2A. In this example, the layer 214 is schematically represented as an object in a layout boundary 216 and is shown moved from a start state A to an end-state B (e.g., a user of the application's GUI has moved a window from one point A on the screen to another point B).

Returning to FIG. 2A, the state change of the layer made by the application 210 are committed almost immediately to the layer tree 222. Once made, the animation and compositing process 224 obtains the change in state of the affected layer from the layer tree 222 using a state-based form of operation. The animation and compositing process 224 then uses characteristics of the start-state and end-state of the layers to determine what animation to use to arrive at the end-state of the layers for display. Finally, the process 224 explicitly applies the determined animation and associated layout of the layers to the data structure of the render tree 226 in a procedural fashion.

To help illustrate the operation of the animation and compositing process 224, FIG. 2B shows example results 262 of animation on an affected layer 264 in a layout boundary 266. The layer 264 is part of the render tree 226 of FIG. 2A and is associated with the changed layer 214 of FIG. 2B. In this example, the layer 264 is being moved in increments of a distance X over a period of time from point A on the display 260 to another point B on the display 260, as the animation and compositing process 224 of FIG. 2A applies the determined animation in a procedural fashion to the render tree 226 of FIG. 2A. It will be appreciated that several layers can be simultaneously changed and animated. By separating the animation and compositing from the application 210 in FIG. 2A, the framework 220 can better synchronize animation with the frame rate 280. In this way, multiple and simultaneous changes made to the layers by the application 210 can be committed in synchronization to the display 260.

II. Embodiment of Layer Kit Framework

A. Framework and Rendering Process

Figure 3:
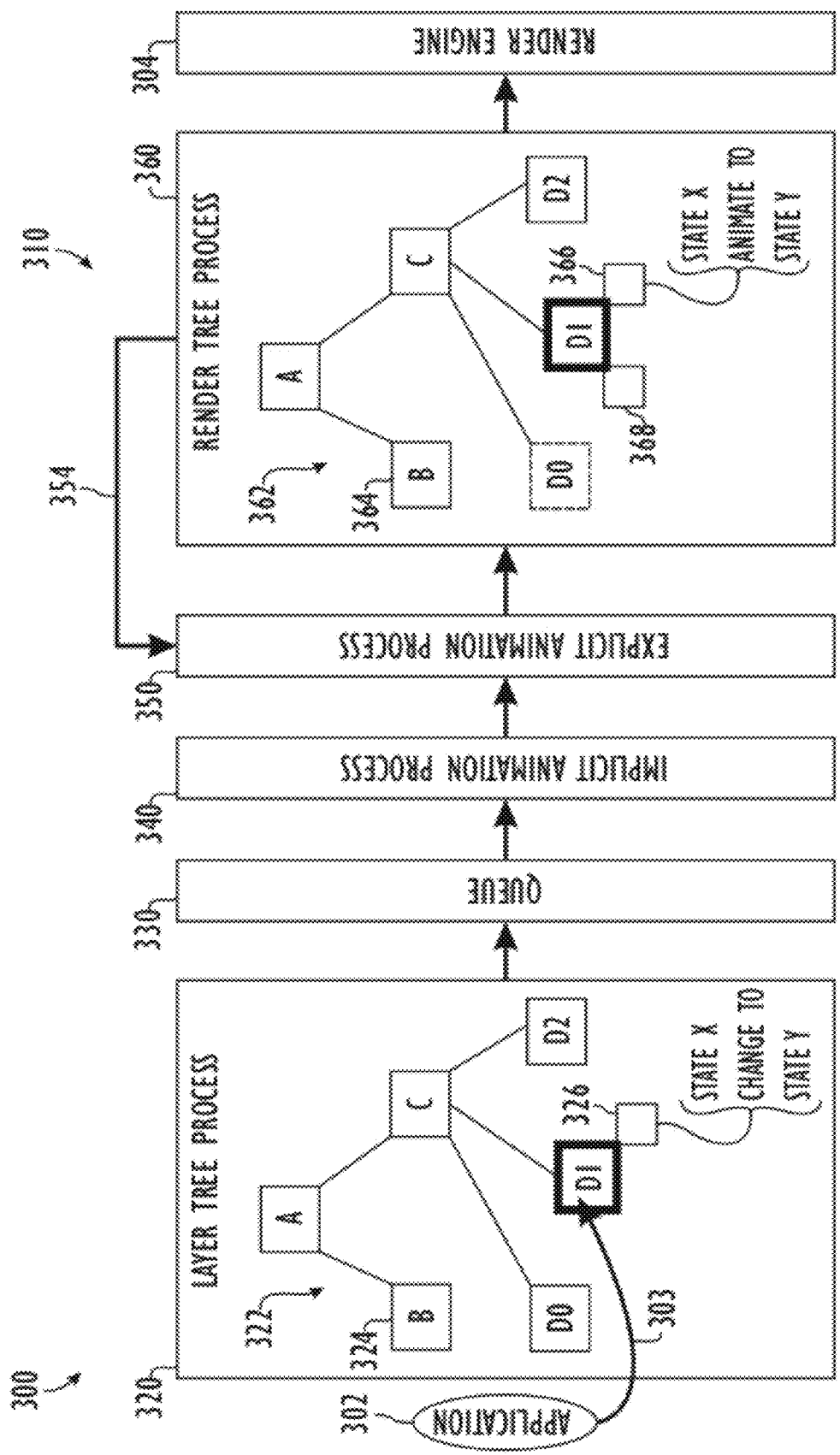
FIG. 3 illustrates a rendering process showing an embodiment of a framework for graphics animation and compositing according to certain teachings of the present disclosure.

Given the above overview of the rendering process and layer kit framework of the present disclosure, we now turn to a more detailed discussion of an embodiment of a layer kit framework according to certain teachings of the present disclosure. In FIG. 3, a rendering process 300 is illustrated showing an embodiment of a layer kit framework 310 for graphics animation and compositing operations. The framework 310 includes a layer tree process 320, a queue 330, an implicit animation process 340, an explicit animation process 350, and a render tree process 360. The framework 310 is part of an object-oriented application environment, such as Cocoa, designed for developing Mac OS X native applications. Files of an Objective-C API for the layer kit framework 310 have been incorporated herein by reference in the computer program listing appendix. The framework 310 can be used to build interactive user interfaces for applications. Preferably, the framework 310 is compatible with Apple's existing Application Kit framework by using an NSView subclass to host layers and other properties of the framework 310 as discussed below.

The layer tree process 320 has a data structure or layer tree 322 that interfaces with an application 302. Like views of NSView, a layer 324 of the framework 310 "draws itself." When it draws itself, the layer 324 is given a CoreGraphics context (CGContext). Unlike NSView, however, rendering commands from the application 302 are not issued immediately, but are instead captured into the retained data structure of the layer tree 322 and are then eventually passed over to the render tree process 360 for processing. The render tree process 360 can then redraw layers 364 in the render tree 362 that are associated with the layers 324 of the layer tree 322 with no intervention by the application 302. This is one purpose for separating the layer tree process 320 from the render tree process 360. The render tree process 360 can always synthesize an up-to-date representation of the layers without needing to call back to the application 302.

The isolation mentioned above also allows the render tree process 360 to be implemented in a number of ways, including allowing the render tree process 360 to reside in another thread or in another process via Interprocess Communication (IPC). For example, the render tree process 360 can be implemented on an NSTimer on a separate thread from the layer tree process 320. The isolation between the layer tree process 320 and the render tree process 360 also allows the layer tree process 320 to be implemented in an object language like Objective-C, while the render tree process 360 can be coded entirely in a procedural language such as C if necessary for performance.

B. Layer Tree and Layers

As shown in FIG. 3, the layer tree 322 is diagrammatically illustrated as a number of layers 324 that are interconnected by dependencies with one another in a hierarchical fashion. It is understood that a computer system can store the layer tree 322 in any format suitable for the computer. Several types of layers 324 can be defined in the framework 310. Some possible types of layers include Image layers, CoreGraphics layers, Text layers, Vector layers (e.g., layers based on CGLayerRef, Client drawable, and display-lists), CoreVideoBuffer or Media layers (e.g., autonomously animating content such as movie or Quark Composer), and other more generic layers.

Before proceeding with the discussion of the rendering process 300 of FIG. 3, we first turn to a discussion of the layers 324 in the layer tree 322 of the framework 310. The layers 324 are substantially similar to "views" of Apple's NSView. Like the "views" in NSView, for example, each layer 324 is associated with a window in which it is displayed, and the layers 324 are related to one another in a hierarchical fashion of superlayers and sublayers because some layers 324 are subregions of other layers 324 in a window.

The framework 310 can use the following classes NSArray, NSDictionary, NSEnumerator, LKAnimation, and CIFilter, and the protocol LKAction. NSArray, NSDictionary, NSEnumerator, and CIFilter are known and used in the art. LKAnimation and LKAction are defined for the disclosed framework 310 of FIG. 3 and are described in the incorporated files. The base layer class for layers 324 in the framework 310 is the NSObject class. However, the base layer class has specific timing (LKTiming) and object (LKObject) protocols for the framework 310 of the present disclosure.

The LKObject protocol for the layers 324 extends the standard NSKeyValueCoding protocol known in the art by adding support for property introspection and customization. All objects implementing the LKObject protocol also implement the NSCoding protocol for object archiving. Each object implementing the LKObject protocol exposes a set of properties declared using the standard Objective-C property syntax. These properties are also accessible via the NSKeyValueCoding protocol. When accessing properties whose values are not objects, the standard Key-Value Coding (KVC) wrapping conventions are used with extensions to support the following types: CGPoint (NSValue), CGSize (NSValue), CGRect (NSValue), and CGAffineTransform (NSAffineTransform).

Many more details of the layers 324 are discussed herein and are included in the incorporated file "LKLayer." Here, we only briefly mention some of the geometrical and hierarchical properties for layers 324 in the framework 310. Many of the properties are similar to those used in Core Graphics. Layers 324 have "bounds" or a coordinate system that are defined by the property CGRect bounds. The position of a layer 324 is defined by the property CGPoint position. The Z component of the position of a layer 324 is defined by the property CGFloat zPosition.

The frame of a layer 324 is defined by the property CGRect frame. Unlike NSView, each layer 324 in the layer hierarchy of the framework 310 has an implicit frame rectangle that is defined as a function of the "bounds," "transform" and "position" properties. When setting the frame of the layer 324, the "position" and "bounds.size" for the layer 324 are changed to match the given frame. The frame and bounds model of the framework 310 is similar to that used for Apple's Application Kit, but only the bounds, offset, and matrix are stored. The frame can be computed using an instance of "method: (CGRect) frame."

Figure 5A:
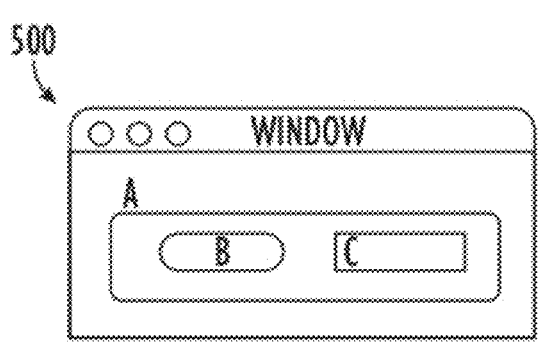
FIGS. 5A through 5C illustrate details of layers for the framework of FIG. 3.
Figure 5A:
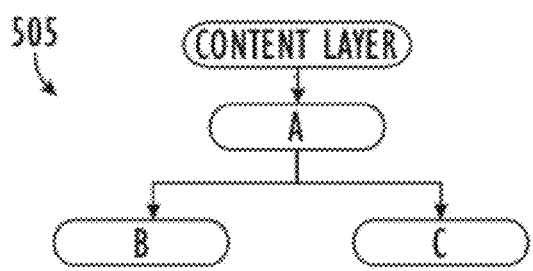
Figure 5B:
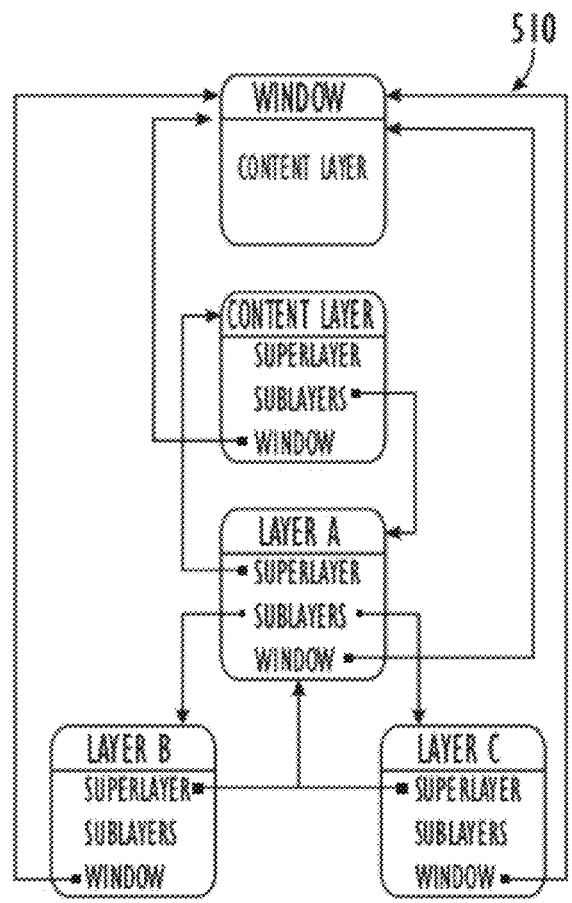
Figure 5C:
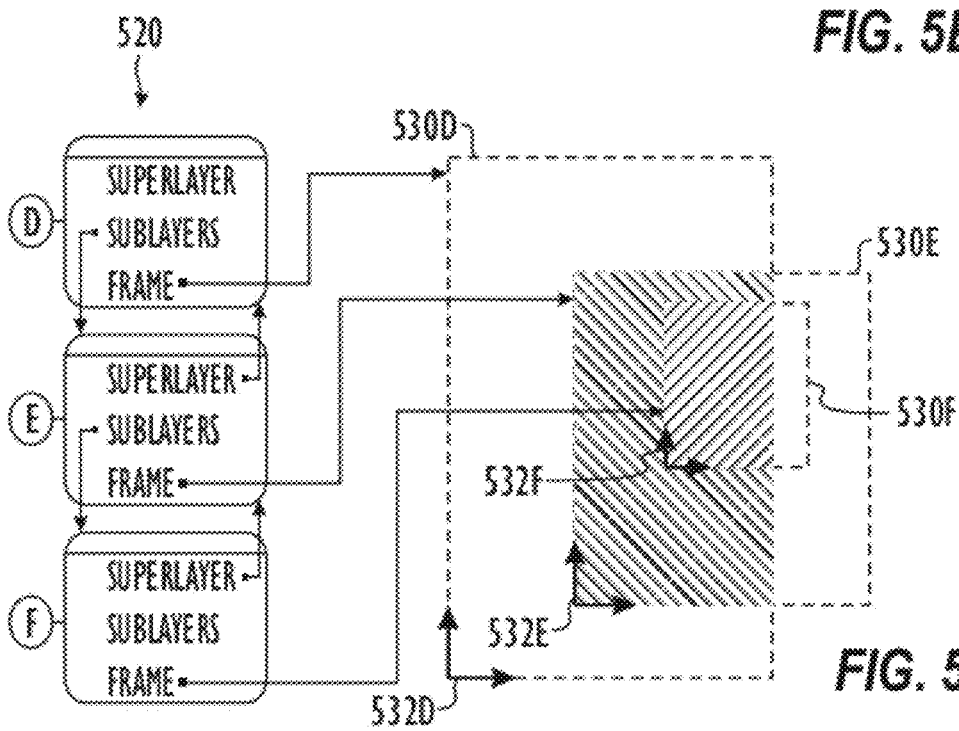

To help visualize the layers 324, their hierarchy in the layer tree 322, the frame and bounds of the layers 324, and other details, we turn briefly to FIGS. 5A-5C. FIG. 5A shows an example of a window 500 of a graphical user interface. The window 500 has three layers A, B, and C. Much like the view hierarchy used in Apple's NSView, the layers A, B, and C in the window 500 are linked together in a layer hierarchy 505, which is also shown in FIG. 5A. In general, each layer can have another layer as its superlayer and can be the superlayer for any number of sublayers. As used herein, a superlayer is the layer that is immediately above a given layer in the hierarchy 505, and a sublayer is the layer that is contained either wholly or partially by the superlayer. In the example of FIG. 5A, the window's content layer is at the top of the hierarchy 505, and layer A in the hierarchy 505 is the superlayer for the sublayers B and C.

FIG. 5B shows the hierarchical relationships 510 between the layers A, B, C, and Content in the layer hierarchy 505 of FIG. 5A. Using the relationships 510 for the layers is beneficial for both drawing and handling events for an application's GUI. In particular, the layer hierarchy 505 of FIG. 5A having the relationships 510 of FIG. 5B permits more complex layers to be constructed out of other sublayers and allows each layer to have its own coordinate system.

In FIG. 5C, for example, the relationships for three example layers 520D, 520E, and 520F are shown where layer 520D is the superlayer of 520E and where layer 520E is the superlayer of 520F. Each layer 520D, 520E, and 520F is defined by a corresponding frame rectangle 530D, 530E, and 530F having its own coordinate system 532D, 532E, and 532F. The "bounds" attribute of the layers 520 defines its coordinate system 532. In general, the frame rectangle 530 of each layer 520 is positioned within the coordinate system 532 of its superlayer. Thus, the frame rectangle 530E for layer 520E is positioned within the coordinate system 532D of layer 520D, and the frame rectangle 530F for layer 520F is positioned within the coordinate system 532E of layer 520E.

When a given layer 520 is moved or its coordinate system 532 is transformed (e.g., rotated, flipped, etc.), all of its sublayers 520 are moved or transformed along with it. Yet, because each layer 520 has its own coordinate system 532, the drawing instructions for that layer 520 can be consistent no matter where the layer 520 is or where its superlayer moves to on a screen.

The frame rectangles 530 essentially define the area of the layers 520—i.e., the tablet on which the layers 520 can draw. The frame rectangle 530 of a given layer 520 can lie within the frame rectangle 530 of its superlayer. In addition, the frame rectangle 530 of a given layer 520 can extend outside its superlayer's frame rectangle 530. For example, the frame rectangle 530F lies entirely within the frame rectangle 530E of its superlayer 520D, but the frame rectangle 530E for layer 520E extends outside the frame rectangle 530D of its superlayer 520D. In contrast to "views" in NSView, the layers 520 can place content outside the frame of their parent layers.

Given the above overview of layers, we now return to a discussion in FIG. 3 of how the layers 324 are interrelated to one another to construct the layout of the layer tree 322 of the disclosed framework 310. The layers 324 in the layer tree 322 are constrained by layer constraints (not shown in FIG. 3). A constraint-based layout manager adds a "constraints" layer property to the data structure for layers 324 in the layer tree 322. The constraint-based layout manager is defined in the incorporated file "LKConstraintLayoutManager." The "constraints" layer property is an array of LKConstraint objects. Each LKConstraint object describes one geometrical relationship between two layers 324 of the layer tree 322. Layout of the layers 324 in the layer tree 322 is performed by fetching the constraints of each sublayer 324 and solving the resulting system of constraints for the frame of each sublayer 324 starting from the bounds of the containing layer 324. The relationships between layers 324 are linear equations of the form: $u = m\ v + c$, where "u" and "v" are scalar values representing geometrical attributes (e.g. leftmost x position) of the two layers 324, and where "m" and "c" are constants. Sibling layers 324 are referenced by name, using a "name" property of each layer 324. A special name "superlayer" is used to refer to the superlayer of a given layer 324.

C. Render Tree and Animation

Now that we have an understanding of the layer tree 322 and its layers 324, we turn to a discussion of details related to the render tree process 360 and render tree 362. As discussed previously, the render tree process 360 has a data structure or render tree 362 that does not interface with the application 302. Instead, explicit animation is made to the render tree 362 by the explicit animation process 350, and the render engine 304 renders from the render tree 362. The render tree 362 is similar to the layer tree 322 in that it contains a description of the layer hierarchical of the layers 324 found in the layer tree 322. Accordingly, the render tree 362 also includes a plurality of layers 364 that are related in a hierarchical fashion and that are associated with the layers 324 of the layer tree 322.

In contrast to the layer tree 322, the render tree 362 further includes animation objects 366 added to the data structure of the layers 364 in the render tree 362. For illustrative purposes, the animation object 366 for one of the layers 364 is diagrammatically shown in FIG. 3 as an appended element to a node D1 that has been changed in the layer tree 322 by the application 302. During processing by the animation processes (implicit and/or explicit), the animation object 366 is added to a representation of the layer 364 in the render tree 362 associated with the changed layer 324 in the layer tree 324. In typical operation of the framework 310, adding the animation object 366 is implicitly invoked through an action that is an LKAnimation object. Details related to LKAnimation object are discussed below and are incorporated file "LKAnimation."

The animation object 366 has a "key," a "duration" property, and other properties and details discussed herein. The "key" is used to identify the animation, and the "key" may be any string such that only one animation per unique key is added per layer 364 in the render tree 362. The special key "transition" is automatically used for transition animations of the layers 364. The "duration" property of the animation object 366 defines the duration of the animation. If the "duration" property of the animation object 366 is zero or negative, it is given a default duration, which can be either a particular value of a transaction property for the render process 300 or can be a default value of 0.25 seconds, for example.

D. Operation of the Framework in the Rendering Process

Figure 4:
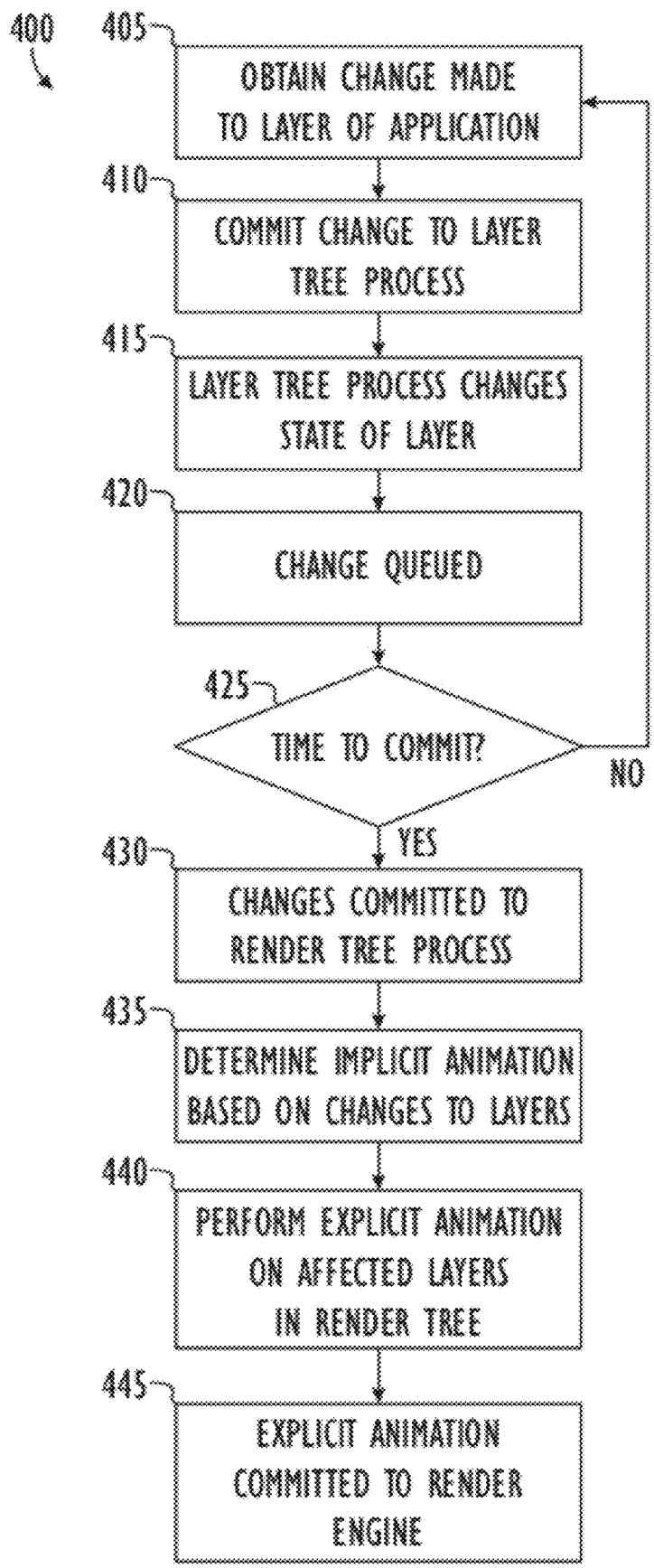
FIG. 4 illustrates details of the rendering process and framework of FIG. 3 in flow chart form.

Given the details of the framework 310 discussed above, we now turn to a discussion of how the framework 310 is used in the rendering process 300. In FIG. 4, the rendering process 300 of FIG. 3 is shown in flow chart form as process 400. For the sake of understanding in the discussion that follows, reference is concurrently made to reference numbers of components in the rendering process 300 of FIG. 3 and to blocks of the process 400 of FIG. 4.

During operation, the application 302 obtains changes made to one or more layers of the application's GUI system (Block 405). The application 302 interfaces with the layer tree process 320 and commits the changes 303 to the layer tree 322 (Block 410). As discussed previously, the changes to the layer tree 322 are not immediately rendered by the render engine 304. Instead, the layer tree process 320 changes the state of one or more affected layers and sublayers 324 in the hierarchy of the layer tree 322 (Block 415). In the example of FIG. 3, a node D1 has had its state changed from X to Y (e.g., the layer associated with node D1 has been moved from one position to another position, has been resized from one size to another size, etc.). The state change to the layer 324 in the layer tree 322 may not include any animation or compositing information, and the state change may merely indicate to the layer tree process 310 the start and end states of the affected layers and sublayers 324 of the hierarchy in the layer tree 322.

The state change of the layers and sublayers 324 is then queued in a queue 320 of the framework 310 (Block 420). The queue 330 is used to commit the state changes to the implicit animation process 340 and periodically determines whether to commit the state changes (Block 425). Preferably, multiple state changes to layers 324 in the layer tree 322 are batched into atomic transactions that are committed together by the queue 330. If it is not time to commit, then the process 400 can return to obtaining additional state changes to the layer tree 322 by the application 310 at Blocks 405 through 415.

If it is time to commit, then the queue 330 commits the state changes to the implicit animation process 340 (Block 430). The implicit animation process 340 includes default animation operations, but explicit overrides can be made. Explicit overrides can be implemented by an appropriately programmed application using the "actions" property of the layers. In addition, explicit overrides can be implemented using a "+defaultActionForKey:" method for implementing a default action for a specified "key" on the layer and using a "-actionForKey:" method for implementing an action for a specified key on the layer The implicit animation process 340 determines what animation operations to perform based on the state changes of the affected layers 324 in the layer tree 322 (Block 435). This determination depends on the "context" of the state change. The context is based on various variables such as the type of layer 324 being changed, the position of the changed layer 324 in the hierarchy of the layer tree 322, any sublayers of the changed layer 324, the type of change, etc. Details related to this determination are provided in more detail later.

Once the animations have been determined, the explicit animation process 350 then implements the determined animations on the associated layers 364 in the render tree (Block 440). In particular, the explicit animation process 350 implements the processes or steps of the animations on the associated layers 364 in the hierarchy of the render tree 362 in a transactional fashion. Eventually, the explicit animations of the render tree 362 are committed to the render engine 304 for rendering and are eventually displayed (Block 445).

E. Additional Details of the Layer Kit Framework

We now return to FIG. 3 to discuss additional details of the framework 310.

1. Transactions in the Framework

As noted previously, changes in the layers 324 associated with the layer tree 322 are "percolated" to the render tree 362. In other words, the layer tree process 320 and the render tree process 360 interact in a transactional model. Changes to the data structure of the layer tree 322 are explicitly "flushed" or "committed" to the render tree 362 in order to have a visual effect. This is similar to window backing store flushing, where a group of changes appears atomically. The difference in the framework 310 is that some of the changes are not necessarily implemented immediately and might implicitly require animation.

If new changes are committed before the explicit animation and render tree processes 320 and 360 have completed animations of affected layers 364, the processes 320 and 360 can still animate to the newly requested state smoothly from its current state, again without the application 302 being involved. If the root (or a subtree) of the hierarchy associated with the layer tree 322 is changed to a completely new scene and committed to the render tree 362, for example, a default scene transition can be explicitly invoked (e.g. 0.5-second dissolve or cube transition can be implicitly applied).

Transactions are the mechanism used by the framework 310 for batching multiple operations to the layer tree 322 into atomic updates to the render tree 362. Details related to the transactions are included in the incorporated file "LKTransaction." Every modification to the layer tree 322 requires a transaction to be part of it. The framework 310 supports two kinds of transactions, "explicit" transactions and "implicit" transactions. The application 302 can call explicit transactions before modifying the layer tree 322 and can commit the explicit transactions after modifying the layer tree 322. Implicit transactions are created automatically by the framework 310 when the layer tree 322 is modified by the application's thread without an active transaction. The implicit transactions are committed automatically when the thread's run-loop next iterates. In some circumstances (i.e., where there is no run-loop, or the run-loop is blocked), it may be necessary to use explicit transactions to get timely updates to the render tree 362.

To handle transactions, the framework 310 defines an LKTransaction, which is an NSObject. Using the framework 310, new transactions can be initiated, all changes made during a current transaction can be committed to the render tree 362, and any extant implicit transactions can be flushed. Preferably, implicit transactions are not committed until any nested explicit transactions have been completed. Transaction properties can include "animationDuration" that defines a default duration in seconds for animations added to layers 364 and can include "disableActions" that suppresses implicit actions for property changes.

Use of transactions and implicit animation in the framework 310 offers a number of advantages in the rendering process 300 of FIG. 3. In one advantage, the separate layer and render trees 322 and 362 keep rendering and display operations "clean." For example, the application 302 can provide an instruction for a layer 324 at a start-state "X" in the layer tree 322 to be changed to an end-state "Y." The layer tree process 320 implements that state change to the affected layer, and the application 302 can then immediately continue to operate as if the affected layer 324 is at end-state "Y." Separately, the explicit animation process 350 and render tree process 360 of the framework 310 process the associated layer 364 of the render tree 362 to animate its change from start-state "X" to end-state "Y."

In the rendering process 300, the application 302 no longer performs the animation. Instead, the framework 310 performs the animation by first determining the animation to perform with the implicit animation process 340 and then implementing the determined animation with the explicit animation process 350. Having the application "assume" the end-state for the affected layer 324 of the layer tree 322 while having the framework 310 animate the associated layer 364 of the render tree 362 to its end-state allows multiple events and changes to be queued up with the layer tree process 320 and queue 330 without the application 302 having to do graphical programming and animation.

2. Animation in the Framework

As noted previously, the framework 310 determines what animations to use for layers 324 changed by the application 302. The type of animation used can depend upon characteristics of a given context of the application's GUI currently being rendered for display. In the framework 310, the animations between states are implicitly determined, and it is assumed that animations will be "gradual" to some extent. If a new position for a layer tree layer 324 is set, for example, the associated render tree layer 364 is implicitly animated from its current position to its new position via a default animation or transition to gradually animate the change. Similarly, when a new layer tree layer 324 is added, an associated render tree layer 364 will have a default "appearance" animation or transition (e.g., a 0.25-second materialize or dissolve).

Preferably, animation behaviors are programmable in the framework 310 by invoking a predefined name of the animation (e.g., Push/Left, Swirl/In, etc.). The framework 310 can define various forms of animation and can have a set of predetermined animations to be used. For example, some animations in the framework 310 can be defined in a manner similar to what is used in Synchronized Multimedia Integration Language. (Synchronized Multimedia Integration Language is technology developed and distributed by the World Wide Web Consortium, W3C). In addition, animations in the framework 310 can include animatable properties, attributes, and filters of layers 324 and can include transitions between changes in the layers 324 of the layer tree 322. Preferably, the framework 310 allows developers to make overrides of default values, such as timing controls for animations.

For example, the framework 310 can define a transition animation subclass that contains various transition types such as "fade", "moveIn", "push", and "reveal." Because some transitions of the animation model may be motion-based, the framework 310 can further define a property subtype for these transitions. The property subtype can be used to specify the direction for the motion-based transitions. For examples, values for this property subtype can be "fromLeft," "fromRight," "fromTop," "fromBottom," and "fromCorner."

Because animations may occur over a period of time, the framework 310 can further define another property subtype for animations that specifies the amount of progress for the animation at which to begin and end execution. In one example, a timing function can define the pacing of the animation. The timing function can define a general keyframe animation class to create an array of objects providing the value of the animation function for each keyframe. Typically, a "keyframe" is a frame used to designate where changes occur in the animation. The framework 310 can also define LKTimingFunction objects. If N number of keyframes are set for the animation, there would typically be N−1 objects in the "timingFunctions" array. Each function in the array describes the pacing of one keyframe to keyframe segment of the animation.

In addition, a path object can define the behavior of an animation. Each point in the path object except for "moveto" points defines a single keyframe for determining the timing and the interpolation of the animation. For constant velocity animations along a path, the animation can be set to a calculated mode of "paced." Other calculated modes can include "linear" and "discrete."

For basic (i.e., single-keyframe) animations, the framework 310 can define a subclass for interpolation objects that define the property values between which an animation is to be interpolated. Preferably, the object type of the interpolation objects matches the type of the property being animated using the standard rules described in incorporated file "LKObject," for example. Some supported modes for interpolating animation include (1) interpolating between a "fromValue" and a "toValue," (2) interpolating between a "fromValue" and (a "fromValue" plus a "byValue"), interpolating between (a "toValue" minus a "byValue") and a "toValue," (3) interpolating between a "fromValue" and the current presentation value of a property, (4) interpolating between the layer's current value of a property in the render tree 362 and a "toValue" for that property, (5) interpolating between the layer's current value of a property in the render tree 362 and that value plus a "byValue", and (6) interpolating between the previous value of a property in the render tree 362 and the current presentation value of that property.

To handle animations of multiple layers, the framework 310 can also define an animation subclass for grouped animations to create an array of LKAnimation objects. Each member of the array can be run concurrently in the time space defined for a parent animation.

In addition to motion, transitions, and other animations disclosed herein, the framework 310 can allow layer properties to be animated as well. For this, the framework 310 can include a set of ValueAnimation classes. In one example, a FloatAnimation value may be defined in one of the ValueAnimation classes so that the X-position of a layer in the GUI could be set to the FloatAnimation value that has been specified to oscillate between two values.

Furthermore, the animations defined in the framework 310 can include animatable filters for the layers. For example, the framework 310 can define additional attributes for CIFilter objects that can be accessible both via the NSKeyValueCoding protocol and through declared properties. These additional attributes can be used to construct keypaths to existing filters so that the framework 310 can set an attribute of a filter attached to a layer 364 and so that animations of the layers 364 may access filter attributes via the key-paths. In this way, the filters for layers 364 can be animatable within the framework 310.

As used herein, a "key" is a string that identifies a specific property of an object. Typically, a key corresponds to the name of an accessor method or instance variable in the receiving object. As used herein, a "key path" is a string of keys separated by "dots." The key-path is used to specify a sequence of object properties to traverse. The property of the first key in the sequence is relative to the receiver, and each subsequent key is evaluated relative to the value of the previous property. For example, the key path "address.street" would get the value of the address property from the receiving object, and then determine the street property relative to the address object.

In one example of animatible filters, a generalized filtering model may include: maskop(mask, compositeop(layerop (layer), backgroundop(background)), background). Here, layerop can be a unary image operator that processes the foreground image. For example, layerop could be used to add a glow to a layer. Backgroundop can be a unary image operator that processes the background image. For example, backgroundop could be used to ripple the background. In addition, compositeop can be a binary image operator that combines the foreground and background, and it can default to source-over or to source-over with shadow if present. Finally, maskop can be a ternary operator that takes a mask and two images and blends them together.

Although the framework 310 preferably provides a number of default animations, overrides can be made available to specify particular animation behaviors. In this way, the GUI of the application 302 can be essentially programmed for "goal states," and the framework 310 can handle the details of animating the layers of the application's GUI towards those goal states. The application 302, therefore, can be developed as if the application 302 is animating the layers of the GUI. However, the application 302 never truly animates the layers of the GUI when the implicit animations of the framework 310 are used.

3. Timing Functions of the Framework

The framework 310 defines a timing protocol called LKTiming that is implemented by layers and animations. Details related to this protocol are included in the incorporated file "LKTiming." The timing protocol of the framework 310 models a hierarchical timing system, with each object describing the mapping from time values in the object's parent to local time. Absolute time is defined as "mach time" (i.e., machine time) converted to seconds. A LKCurrentTime function is provided as a convenience for querying the current absolute time. Conversions can also be made between different versions of time. The timing model of the framework 310 can allow animations to repeat their basic duration multiple times and can optionally allow animations to play backwards before repeating.

Animations may use various timing functions defined in the framework 310. For example, the timing functions in the framework 310 can generally be represented by segments of functions describing timing curves. These functions can map input time normalized to a range such as between [0,1] to output time also in the range [0,1]. The timing functions for the framework 310 can be used to define the pacing of an animation over its duration (or over the duration of one keyframe). Common timing functions can also be created and used in the framework 310, such as "linear," "easeIn," "easeOut," and "easeInEaseOut." In addition, timing functions can be created that are modeled on a cubic Bezier curve, where the end points of the curve are at (0,0) and (1,1) and where the two points "c1" and "c2" defined by the class instance are the control points. Thus, the points defining the Bezier curve can be: "[(0,0), c1, c2, (1,1)]."

4. Other Forms of Time-Varying Images

Not all time-varying images, however, can be modeled as state transitions of the layers from one state to another state. Some layers (e.g., Video, Flash or Quartz Composer) are "media layers" in that these media layers have timing and other behaviors that are intrinsic to them. Because media layers may need to be representable as nodes in the layer tree 322, the framework 310 includes a MediaLayer abstraction for interacting with CoreVideo compliant media. The MediaLayer abstraction is used for the media layers 324 of the layer tree 322 that have intrinsic animation and that have their appearance change as a function of time. The media layers can reference a media file. The media can be abstract and needs to provide a compliant "frame for time" accessor for the render tree process 360 to use and needs to provide a time mapping between the notion of time for the render tree process 360 and the notion of time for the media in the media layer. All of the standard layer attributes (Opacity, transform, shadow, etc.) can be applied in the render tree process 360 for the media layer.

Other common objects for display in an application's GUI that have intrinsic timing include the "pulsing button," "rotating gear," "progress bar," animated GIF, or other similar objects. These can be specified by a particular type of media layer that has its animation represented by a set of images. For this type of media layer, the layer itself can provide a time-varying method for drawing itself for each frame when rendered from the render tree 362. For example, the framework 310 samples this type of media layer at an appropriate number of times and provides the frames as an atomic set to the render tree process 360. The render tree process 360 then plays out the animation (either in a one-shot fashion or, more typically, in a looped fashion) so that the layer 364 can be animated for display.

5. Layer Resizing

A layer 324 can exhibit a number of behaviors when its frame rectangle is changed by the application 302. In a default mode, the bounds (i.e., the coordinate system) are not changed, and the layer's contents are merely scaled. Since a display list representing the content is resolution independent, the display list just needs to be replayed through the new current transformation matrix (CTM), which is used to transform the bounds and frame of the layers. The other mode of resizing a layer 324 is just to give the resized layer more or less "real-estate" and not to change the size of any of its items. In this case, any sublayers of the resized layer 324 are resized according to their auto sizing information. This information relates how a sublayer's frame changes when its parent layer's bounds change. Because each layer 324 retains its own drawing information, resizing can occur without necessarily invoking drawing code of the application 302. The only cases where intervention by the application 302 may be necessary is when a layer's representation is a function of its bounds (such as text layout). In this case, the application 302 may defer computing the new representation for the text layer and can work with the old representation for the text layer until the resize is complete.

6. Attributes for Layers

Below is a detailed discussion of various attributes for layers that can be defined in the framework 310. This discussion is not meant to be exhaustive of all of the attributes that can be used for layers and is merely intended to provide a number of example attributes that can be used. Each layer can have one or more of these various attributes. In general, the framework 310 can use many of the attributes associated with Quartz. As is known in the art, Quartz is part of the Mac OS X graphics and windowing environment. In addition to the attributes associated with Quartz, the framework 310 can define other attributes discussed below. Some of the attributes discussed below are referenced in terms of Quartz.

A "bounds" attribute for a layer is a CGRect type of attribute, which in Quartz is the data structure that represents the location and dimensions of a rectangle. The "bounds" attribute gives a layer's intrinsic bounds in the coordinate system of the layer. In the framework 310 of the present disclosure, it may be desirable to also define attributes for a filter and a shadow coordinate system that can be used if a layer is scaled.

A "position" attribute is a CGPoint type of attribute, which in Quartz is the data structure that represents a point in a two-dimensional coordinate system. The "position" attribute defines the position of a layer in parent layer's coordinate system. This is the center of the layer's bounds rectangle transformed to the parent layer's coordinate system.

A "parent" attribute defines a layer as a parent layer (e.g., superlayer) in relation to other layers in the hierarchy of the data structures. Similarly, a "children" attribute is an NSArray type of attribute that defines sublayers. A "contents" attribute for a layer is a CGLayerRef type of attribute, which defines an opaque attribute type that represents a Quartz layer. The "contents" attribute gives the results of the last draw captured as a display list. The "contents" attribute can also be set directly, allowing the contents of a layer to be set from a CGLayerRef.

An "hidden" attribute for a layer is a Boolean type of attribute. The "hidden" attribute is TRUE if the layer (and all of its sublayers) is not to be displayed. This allows an object to stay in the layer tree but not necessarily be rendered for display. When the state of this attribute changes, the appropriate implicit animation (e.g., dissolve, appear, etc.) is performed on the layer.

"Flag" attributes for a layer are attributes that can be used for various purposes. For example, flag attributes can be provided for autoresize mask, content resize mask, and redraw. An autoresize mask flag can indicate whether the mask should be autoresized. A content resize mask flag can be used to determine how to map content when a layer's bounds do not match its content's bounds. A needs redraw flag can indicate that a redraw is needed when bounds of a layer change. To a developer, however, these flag attributes will simply appear as normal attributes.

An "extendedAttributes" attribute for a layer is defined in Apple's NSDictionary class, which declares an API for objects that manage immutable associations of keys and values. This attribute gives a dictionary of extra attributes that can be set by calling the method setValue:forKey: on a layer. When these extended attributes are set on a layer, the render tree can preferably smoothly animate the value from one state to another. A developer using the framework 310 to create an application, however, will not perceive any difference between attributes and extended attributes.

An "actions" attribute is also defined in NSDictionary. This attribute gives a dictionary of animation behaviors, such as visibility animation, durations, etc. The dictionary maps property names to animation objects, which is how implicit animations are overridden as discussed previously.

As noted above, the framework 310 can have a number of attributes defined in a dictionary for a layer. The dictionary contains additional appearance attributes. These attributes and all layer attributes can be set via Key-Value Coding (KVC), which is a protocol of Apple's Cocoa for getting and setting values generically. The attributes are added to the dictionary when set using KVC and are searched for in the dictionary when the attributes are looked up. If the attribute is not present and the extended attribute dictionary has a "style" key (discussed below), the lookup continues recursively. If no value is found during the lookup process, a default value is adopted. This allows extended attributes to exist in a styling hierarchy and allows attribute bundles to be efficiently shared among multiple layers. Because the layer tree 322 is not traversed at the frame rate (e.g., 280 of FIG. 2A), the lookup operation for extended attributes may not be computationally expensive. An efficient render tree implementation would likely deal with flattened attributes exclusively.

The following Table 2 provides a number of attributes that can be used for layers in the framework 310. Additional attributes or properties are defined in the incorporated file "LKLayer."

TABLE 2

Summary of Attributes

| Attribute | Type | Default Value | Description |
|---|---|---|---|
| actions | NSDictionary | nil | Dictionary that maps property names to animation objects. |
| autoresizingMask | unsigned int | 0 | A bitmask that defines how a layer is resized when the bounds of its superlayer changes. |
| backgroundColor | CGColorRef | Clear | Defines a color with which a layer's bounds will be cleared before it is drawn. This can also be a color created from a pattern. Having this explicit allows the render tree to perform occlusion culling. |
| backgroundFilters | NSArray of CIFilters | Null | Gives an optional set of filters that filter the background of a layer. |
| borderColor | CGColorRef | black | Defines the color of the border for a layer. |
| borderWidth | CGFloat | 0 | Defines the width of the border for a layer. |
| bounds | CGRect | null | Defines the coordinate system of a layer. |
| composite | CIFilter | CISource OverComposite | Gives a CIFilter that takes two inputs (inputImage and backgroundImage). Called to render a layer onto the background image. |
| compositeFilter | CIFilter | nil | Gives a CoreImage filter used to composite the layer with its (possibly filtered) background. Implies source-over compositing. |
| contents | CGImageRef | nil | Defines an object providing the contents of a layer. |
| contentsGravity | NSString | resize | Defines how the contents of the layer is mapped into its bounds rect. |
| cornerRadius | CGFloat | 0 | Defines the radius of the corners of a layer. |
| delegate | id | nil | Defines an object that will receive a LKLayer delegate method. |
| doubleSided | BOOL | YES | When false layers facing away from the viewer are hidden from view. |
| filters | NSArray | nil | Gives filters to |

TABLE 2-continued

Summary of Attributes

| Attribute | Type | Default Value | Description |
|---|---|---|---|
| hidden | BOOL | NO | process a layer. Defines whether a layer is to be displayed or not. |
| layerFilters | NSArray of CIFilters | Null | Gives an optional set of filters to process a layer after rendering, but before compositing. |
| layoutManager | id | nil | Gives the object responsible for assigning frame rects to sublayers. |
| mask | Layer | Null | Gives the layer to clip to. Clipping is performed by computing the effective alpha mask of the layer (including mask layer's opacity). |
| masksToBounds | BOOL | NO | Gives an implicit mask matching a layer bounds is applied to the layer when true. |
| name | NSString | nil | Gives the name of the layer. |
| opacity | float | 1 | Gives opacity of a layer and cumulatively applies to all sublayers. |
| position | CGPoint | 0, 0 | Defines the position of a layer in parent layer's coordinate system. |
| shadowColor | CGColorRef | black | Gives shadow color for layer. |
| shadowOffset | CGSize | 0, −3 | Gives shadow offset for layer. |
| shadowOpacity | float | 0 | Gives shadow opacity for layer. |
| shadowRadius | CGFloat | 3 | Gives shadow radius for layer. |
| style | NSDictionary | Null | Gives the next dictionary in stack to search for attribute lookups. |
| sublayers | NSArray | nil | Gives the array of sublayers of a layer. The layers are listed in back to front order. |
| transform | LKTransform | Identity | Gives layer's orientation relative to parent's coordinate system. This matrix is applied in a space with the center of the layer at the origin (e.g., to rotate a layer about its center, this matrix should be a pure rotation). |
| zPosition | CGFloat | 0 | Gives the Z component of the layer's position in its superlayer. |

7. Methods or Functions of the Framework

In addition to the attributes discussed above, the framework 310 has a number of methods or functions—some of which have already been discussed and some of which will now be discussed. A "drawSelf:" function is used to draw a layer into a CGContext. In Quartz, the CGContext defines an opaque type of graphics context that represents a Quartz 2D drawing environment and that functions to create, manage, and operate on the drawing environment. As is known in the art, Quartz 2D is a two-dimensional drawing API that allows developers to produce many of the visual effects (e.g., translucency, drop shadows, etc.) used in the user interface of Mac OS X. The render tree 362 needs the complete description of layers 364 in order to provide animation so the function is configured for the layer 364 to draw itself. A layer 364 that provides scrolling should just draw its entire contents. If an incremental update is to be performed on the scrollable view, then some of the view can be left blank for update later. This function is similar to an NSView drawSelf: function.

A "setValue:forKey:" function sets layer attributes to new values. This will usually result in an animation in the render tree 362. If a transaction is open, the update will be appended to that transaction. If no transaction is open, an implicit transaction is created, and the update is added to that transaction so the update can be sent to the render tree 362 for processing. A "display" function can send display instructions externally. It is only necessary to call the display function when the "drawSelf:" function needs to compute a new state for the layer. A "layoutSublayers" function can be overridden by subclassers to be called when bounds of a layer change. If not overridden, the layout of children layers will use auto-resizing when bounds change because auto-resizing is always used when bounds change.

To provide custom animations for certain events, the method "actionForKey:" can be overridden to return an LKAnimation object. For example, the method "actionForKey:" can be overriden when the "hidden" attribute changes, to specify "Swirl-In" as opposed to the default appearance animation. A "setAutoResizeMask:" function is similar to NSView's autoresize mask and can be used to controls the constraints between a layer's frame and its superlayer's bounds.

An [LKTransaction begin] method can be used to open a transaction session for a layer (and all of its sublayers). Transactions can nest. Only when the outermost transaction is closed is the data committed to the render tree 362. An [LKTransaction commit] method ends the current transaction. Only when the outermost transaction is closed is the data committed to the render tree 362. An additional method can be provided to abort a current transaction so that the layer tree 322 can be reset to initial values.

8. Event Handling for Layers

The GUI for the application 302 will typically have layers that incorporate interactive behavior for producing events. For example, a layer of the application 302 can represent a "button" of the GUI. Because a "button" in the framework 310 is made up of many sublayers (e.g., title, left-cap, center, right-cap, shadow), the hierarchy for interacting with the "button" is likely to be much coarser grained than the layer tree 322. Accordingly, the framework 310 can provide a protocol implemented by the layers 324 that provide interactive behaviors (e.g., a mouse suite of methods, a keyboard suite, etc. . . . ). Alternatively, the layers 324 for the "button" or other interactive event can be aggregated into an interactive object defined in the framework 310 so that the individual layers 324 can be handled together as a group.

For example, the framework 310 can define action objects that respond to events via the LKAction protocol. The LKAction protocol, which is included in the incorporated file "LKAction," may be used to trigger an event named as a "path" on a receiver function. The layer 324 on which the event happened is identified in the protocol, and arguments of the protocol can carry various parameters associated with the event. When an action object is invoked, it receives three parameters: the name of the event, the layer 324 on which the event happened, and a dictionary of named arguments specific to each event kind. There are three types of events: property changes, externally-defined events, and layer-defined events. Whenever a property of a layer 324 is modified, the event with the same name as the property is triggered. External events are determined by calling a key path and looking up the action associated with the event name.

III. Resource Management with the Layer Kit Framework

As noted previously, separating the layer tree process 320 from the render tree process 360 offers a number of benefits in the framework 310 of the present disclosure. In addition to these benefits, the framework 310 of the present disclosure preferably improves resource management using a "dirty regions" technique and a "buffer handling" technique discussed below.

A. Dirty Region Technique

Preferably, operation of the render tree process 360 and render engine 304 focuses on "dirty regions" of the render tree 362. The "dirty regions" includes those layers 364 of the render tree 362 that need to be rendered because changes have been made to those layers 364. During operation, the render tree process 360 determines which regions (layer, sublayer, group of layers, etc.) have changed and appends the associated layers 364 with a change object, which is diagrammatically shown in FIG. 3 as element 368. Change objects 368 are added to the data structure of the render tree 362 for the associated layers 364. The change objects 368 are updated with each transaction of the render tree process 360 to keep track of which layers 364 of the render tree 362 that have changed relative to their immediate prior version.

During rendering and compositing, the marked layers 364 are then stored in a cache. The storage of the marked layers 364 accounts for the relationships of the layers 364 in the render tree 362 to one another and, in addition, accounts for changes to the layers 364 due to animation. When a sublayer 364 is changed, for example, it is marked as changed and any parent layer 364 of it in the render tree 362 is also marked as having something that has changed. The cache does not store the actual contents (pixel information, etc.) of the layers 364. Rather, each affected layer 364 is stored. The cached layers 364 are then made available to the render engine 360 for rendering. By focusing on the "dirty regions," the render engine 304 can operate more efficiently and reduce the amount of image that is updated via compositing to only those layers 364 of the render tree 362 that have been modified since the last composite operation.

B. Buffer Handling Technique

Figure 6:
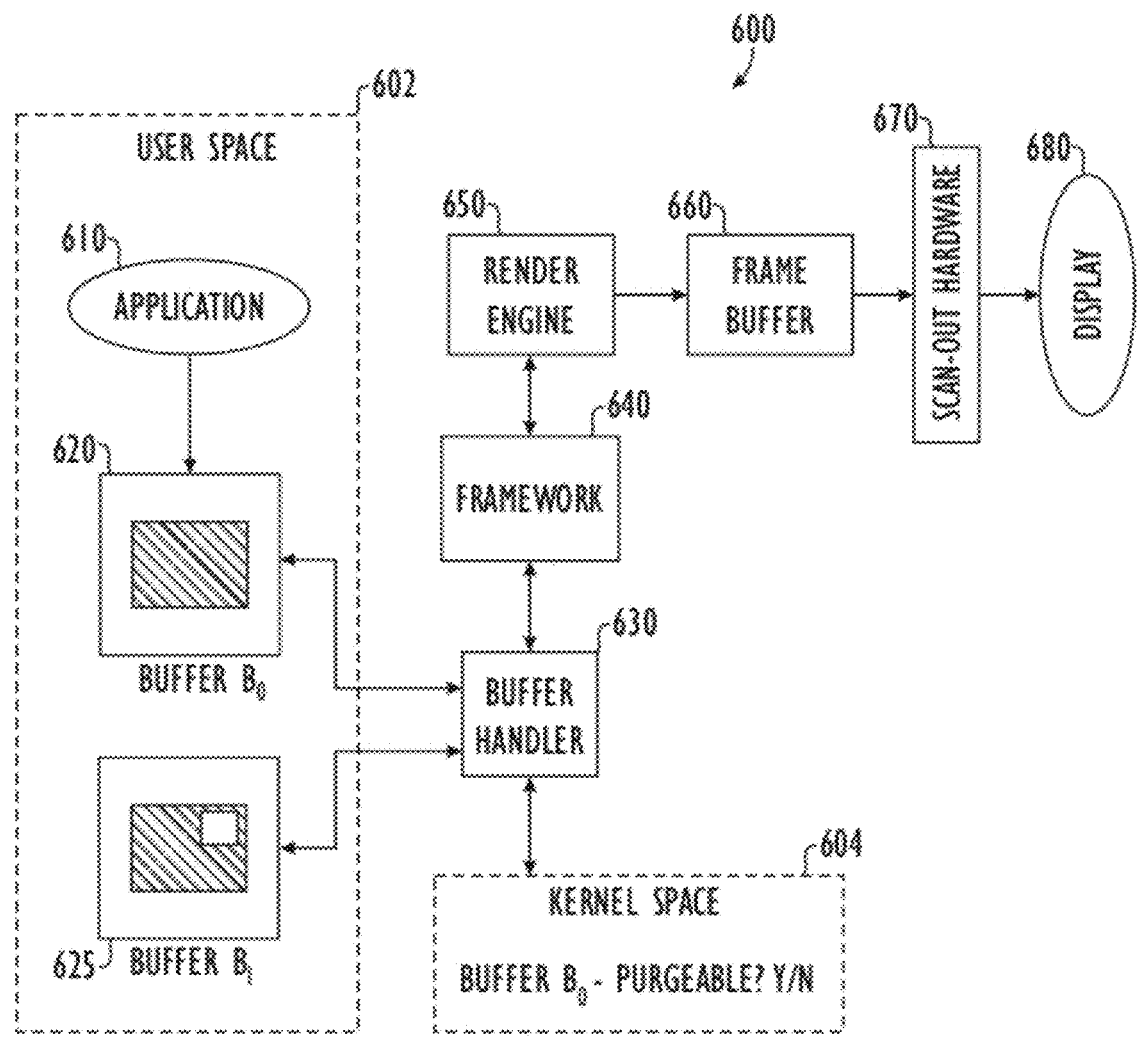
FIG. 6 illustrates a rendering process having a framework and a buffer handler according to certain teachings of the present disclosure.

Rendering processes may not necessarily use resources efficiently (e.g., memory, time, etc.). Referring to FIG. 6, one embodiment of a rendering process 600 to improve resource management is schematically illustrated. The rendering process 600 includes an application 610, one or more buffers or backing stores 620, 625, a buffer handler 630, a framework 640, a render engine 650, a frame buffer 660, scan-out hardware 670 and a display 680.

In much the same manner as discussed in previous embodiments, the framework 620 includes a layer tree (not shown) and a render tree (not shown), which require buffers in memory. The render engine 650 renders information from the framework 620 and inputs the rendered information into the frame buffer 660, and the scan-out hardware 670 outputs the information from the frame buffer to the display 680. To improve resource management, the buffer handler 630 operates in conjunction with the framework 640 and controls the buffers used for the layer tree and/or the render tree of the framework 640.

Figure 7:
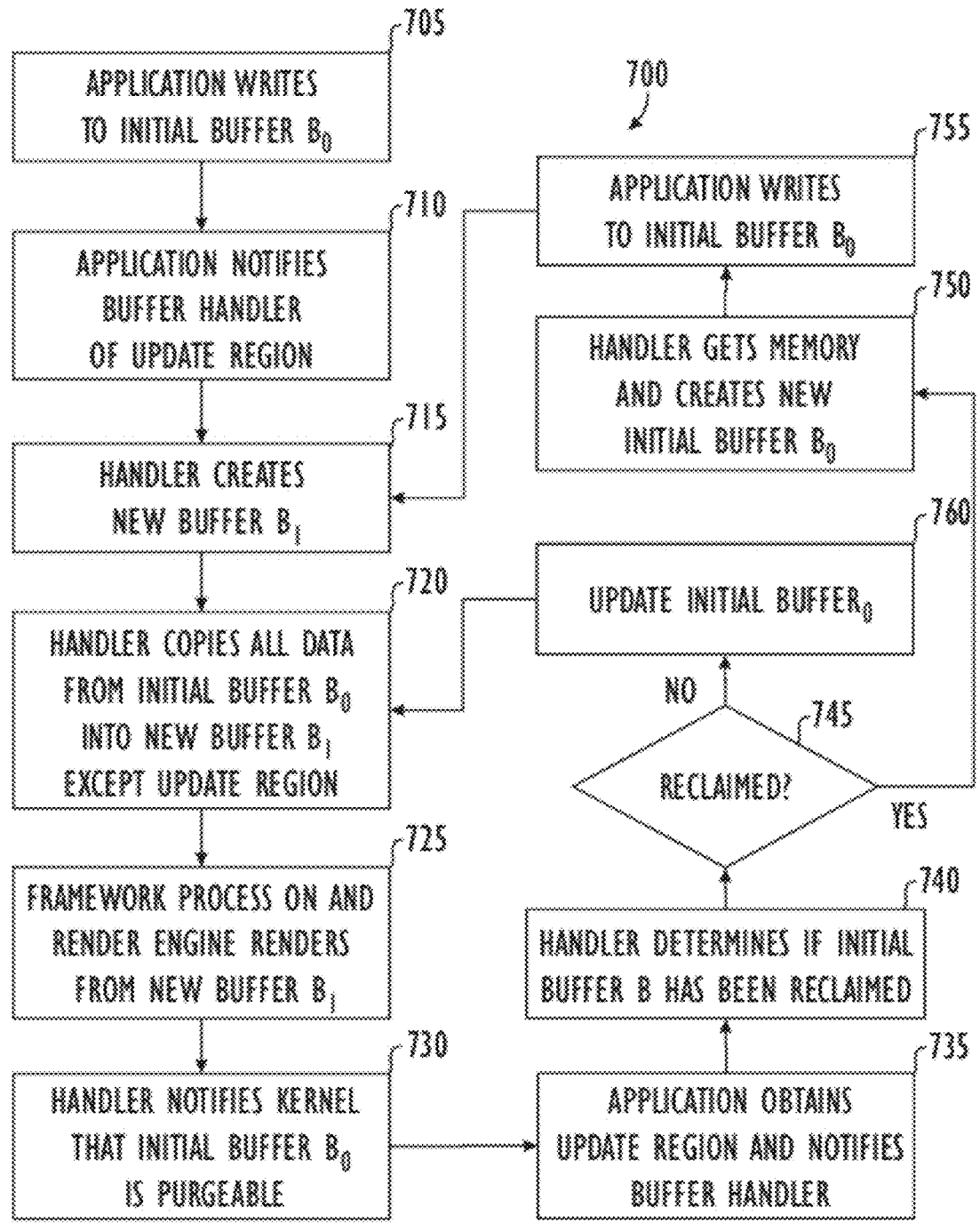
FIG. 7 illustrates details of the rendering process of FIG. 6 in flow chart form.

A process of how the buffer handler 630 manages buffers for the layer tree of the framework 640 is shown in flow chart form in FIG. 7. For the sake of understanding in the discussion that follows, reference is concurrently made to elements in the rendering process 600 of FIG. 6 and to blocks of the process 700 of FIG. 7. In general, the buffer handler 630 can handle a set of the buffers 620 and 625 for each layer of the application's 610 GUI. In addition, more than two buffers 620 and 625 can be used for each set.

Initially, an application 610 operating in the user space 602 of a computer system writes GUI information to an initial buffer or backing store $B_0$ 620 allocated in memory (Block 705). At some point, the application 610 may receive an update to a region (e.g., one or more layers) of the GUI information in the initial buffer $B_0$ 620. For example, a user may make a change in the application 610 (e.g., a layer may be moved, resized, etc.) after the initial buffer $B_0$ 620 has been created. The buffer handler 630 is notified by the application 610 that a subregion of the initial buffer $B_0$ 620 is to be updated (Block 710). For example, as discussed above, changes made to the GUI information of the application 610 are committed to the layer tree (not shown) of the framework 640, which can then provide notice to the buffer handler 630. In response, the buffer handler 630 creates a new buffer $B_1$ 625 and copies the entire contents from the initial buffer $B_0$ 620 to the new buffer $B_1$ 625 except for the subregion 626 to be updated (Block 720). The framework 640 then uses the new buffer $B_1$ 625 for its graphics animation and compositing operations, and the render engine 650 renders from the new buffer $B_1$ 625 (Block 725).

Subsequently, the buffer handler 630 notifies the kernel space 604 to mark the initial buffer $B_0$ 620 as "purgeable" (Block 730). Marking the initial buffer $B_0$ 620 as "purgeable" means that the memory associated the initial buffer $B_0$ 620 can be reclaimed by the kernel space 604 if needed by the kernel during subsequent processing, otherwise the initial buffer $B_0$ 620 will be left as it is.

During subsequent processing, the application 610 obtains a new update region and notifies the buffer handler 630 (Block 735). The buffer handler 630 determines from the kernel space 604 whether the initial buffer $B_0$ has been reclaimed (Blocks 740 and 745). If it has been reclaimed (i.e., the kernel space 604 let the initial buffer $B_0$ 620 be purged during subsequent processing), then buffer hander 630 must get new memory and create a new initial buffer $B_0$ (Block 750). Then, the application 610 writes to this new initial buffer $B_0$ (Block 755), and the process 600 repeats. For example, the buffer handler 630 creates a new buffer $B_1$ (Block 715), copies all of the initial buffer $B_0$ into the new buffer $B_1$ except of for the new update region (Block 720). The framework 640 can process on the new buffer $B_1$ to implement animations, for example, and the render engine 650 renders from the new buffer $B_1$ (Block 725), and the initial buffer $B_0$ is marked as purgeable (Block 730), until the next new update region is obtained.

Advantageously, however, the initial buffer $B_0$ 620 that was marked as purgeable at Block 730 may not have been reclaimed. If it has not been reclaimed at Block 645 after the application 610 has received the new update region, then the buffer handler 630 may only need to update part of that old initial buffer $B_0$ 620 in order to use it again for processing. In this situation, the buffer handler 630 updates the old initial buffer $B_0$ 620 by copying into it the differences between it and the previous updated region (Block 760). From this point, the old initial buffer $B_0$ 620 can be reused for processing. Accordingly, the buffer handler 630 creates a new buffer $B_1$ (Block 715), copies all of the old initial buffer $B_0$ 620 into the new buffer $B_1$ except of for the new update region (Block 720). The framework 630 process on and the render engine 650 renders from the new buffer $B_1$ (Block 725), and the old initial buffer $B_0$ 620 is again marked as purgeable (Block 730), until the next new update region is obtained.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A memory management method, comprising:
   storing first user-interface information in a first memory buffer, the first user-interface information received from an application executing on a computer processor;
   receiving notice of a first update from the application, the first update corresponding to a first region in the first memory buffer;
   copying the first user-interface information from the first memory buffer, except for the first region, into a second memory buffer to create second user-interface information;
   transferring, at a first time, the second user-interface information from the second memory buffer to a display memory buffer;
   transferring, at a second time, update information for the first update region to the display memory buffer, wherein the first and second times are different; and
   marking the first memory buffer as reusable.

2. The method of claim 1, further comprising:
   receiving notice of a second update from the application, the second update corresponding to a second region in the second memory buffer;
   determining the first memory buffer is available for reuse; and
   obtaining use of the first memory buffer.

3. The method of claim 2, further comprising:
   copying the second user-interface information from the second memory buffer, except for the second update region, into the first memory buffer to create third user-interface information;
   transferring, at a third time, the third user-interface information from the first memory buffer to the display memory buffer;
   transferring, at a fourth time, update information for the second update region to the display memory buffer, wherein the third and fourth times are different; and
   marking the first memory buffer as reusable.

4. The method of claim 1, further comprising:
   receiving notice of a second update from the application, the second update corresponding to a second region in the second memory buffer;
   determining the first memory buffer has been purged; and
   obtaining use of a third memory buffer.

5. The method of claim 4, further comprising:
   copying the second user-interface information from the second memory buffer, except for the second update region, into the third memory buffer to create third user-interface information;
   transferring, at a third time, the third user-interface information from the third memory buffer to the display memory buffer;
   transferring, at a fourth time, update information for the second update region to the display memory buffer, wherein the third and fourth times are different; and
   marking the third memory buffer as reusable.

6. The method of claim 1, wherein the act of receiving notice of a first update comprises obtaining use a second memory buffer.

7. The method of claim 1, wherein the act of transferring update information for the first update region to the display memory buffer, comprises transferring animation information for the first update region to the display memory buffer.

8. A non-transitory program storage device, readable by a computer processor and comprising instructions stored thereon to cause the computer processor to:
   store first user-interface information in a first memory buffer, the first user-interface information to be received from an application executing on a computer processor;
   receive notice of a first update from the application, the first update corresponding to a first region in the first memory buffer;
   copy the first user-interface information from the first memory buffer, except for the first region, into a second memory buffer to create second user-interface information;
   transfer, at a first time, the second user-interface information from the second memory buffer to a display memory buffer;
   transfer, at a second time, update information for the first update region to the display memory buffer, wherein the first and second times are different; and
   mark the first memory buffer as reusable.

9. The non-transitory program storage device of claim 8, further comprising instructions to cause the computer processor to:
   receive notice of a second update from the application, the second update corresponding to a second region in the second memory buffer;
   determine the first memory buffer is available for reuse; and
   obtain use of the first memory buffer.

10. The non-transitory program storage device of claim 9, further comprising instructions to cause the computer processor to:
    copy the second user-interface information from the second memory buffer, except for the second update region, into the first memory buffer to create third user-interface information;
    transfer, at a third time, the third user-interface information from the first memory buffer to the display memory buffer;
    transfer, at a fourth time, update information for the second update region to the display memory buffer, wherein the third and fourth times are different; and
    mark the first memory buffer as reusable.

11. The non-transitory program storage device of claim 8, further comprising instructions to cause the computer processor to:
    receive notice of a second update from the application, the second update corresponding to a second region in the second memory buffer;
    determine the first memory buffer has been purged; and
    obtain use of a third memory buffer.

12. The non-transitory program storage device of claim 11, further comprising instructions to cause the computer processor to:
- copy the second user-interface information from the second memory buffer, except for the second update region, into the third memory buffer to create third user-interface information;
- transfer, at a third time, the third user-interface information from the third memory buffer to the display memory buffer;
- transfer, at a fourth time, update information for the second update region to the display memory buffer, wherein the third and fourth times are different; and
- marking the third memory buffer as reusable.

13. The non-transitory program storage device of claim 8, wherein the instructions to cause the computer processor to receive notice of a first update comprises instructions to cause the computer processor to obtain use a second memory buffer.

14. The non-transitory program storage device of claim 8, wherein the instructions to cause the computer processor to transfer update information for the first update region to the display memory buffer, comprises instructions to cause the computer processor to transfer animation information for the first update region to the display memory buffer.

15. A computer system, comprising:
- a display unit;
- a computer processor; and
- non-transitory memory communicatively coupled to the display unit and the computer processor and having stored thereon instructions that, when executed by the computer processor cause the computer processor to—
  - store first user-interface information in a first memory buffer of the non-transitory memory, the first user-interface information to be received from an application executing on the computer processor;
  - receive notice of a first update from the application, the first update corresponding to a first region in the first memory buffer;
  - copy the first user-interface information from the first memory buffer, except for the first region, into a second memory buffer of the non-transitory memory to create second user-interface information;
  - transfer, at a first time, the second user-interface information from the second memory buffer to a display memory buffer of the non-transitory memory;
  - transfer, at a second time, update information for the first update region to the display memory buffer, wherein the first and second times are different;
  - transfer the second user-interface information and the update information for the first update region from the display memory buffer to the display unit; and
  - mark the first memory buffer as reusable.

16. The computer system of claim 15, wherein the non-transitory program storage device further comprises instructions to cause the computer processor to:
- receive notice of a second update from the application, the second update corresponding to a second region in the second memory buffer;
- determine the first memory buffer is available for reuse; and
- obtain use of the first memory buffer.

17. The computer system of claim 16, wherein the non-transitory program storage device further comprises instructions to cause the computer processor to:
- copy the second user-interface information from the second memory buffer, except for the second update region, into the first memory buffer to create third user-interface information;
- transfer, at a third time, the third user-interface information from the first memory buffer to the display memory buffer;
- transfer, at a fourth time, update information for the second update region to the display memory buffer, wherein the third and fourth times are different; and
- mark the first memory buffer as reusable.

18. The computer system of claim 15, wherein the non-transitory program storage device further comprises instructions to cause the computer processor to:
- receive notice of a second update from the application, the second update corresponding to a second region in the second memory buffer;
- determine the first memory buffer has been purged; and
- obtain use of a third memory buffer of the non-transitory memory.

19. The computer system of claim 18, wherein the non-transitory program storage device further comprises instructions to cause the computer processor to:
- copy the second user-interface information from the second memory buffer, except for the second update region, into the third memory buffer to create third user-interface information;
- transfer, at a third time, the third user-interface information from the third memory buffer to the display memory buffer;
- transfer, at a fourth time, update information for the second update region to the display memory buffer, wherein the third and fourth times are different; and
- marking the third memory buffer as reusable.

20. The computer system of claim 15, wherein the instructions to cause the computer processor to receive notice of a first update comprises instructions to cause the computer processor to obtain use a second memory buffer of the non-transitory memory.

21. The computer system of claim 15, wherein the instructions to cause the computer processor to transfer update information for the first update region to the display memory buffer, comprises instructions to cause the computer processor to transfer animation information for the first update region to the display memory buffer.

* * * * *